United States Patent
Poindron et al.

(10) Patent No.: US 7,735,861 B2
(45) Date of Patent: Jun. 15, 2010

(54) HYBRID TYPE GAS GENERATOR CONTAINING A METAL CHARGE

(75) Inventors: Cyrille Poindron, Pont de Buis les Quimerch (FR); Laurent Costecalde, Quimper (FR); Catherine Luquet, Quimper (FR); Ludovic Lageat, Plomodiern (FR)

(73) Assignee: Autoliv Development AB, Vargarda (SE)

( * ) Notice: Subject to any disclaimer, the term of this patent is extended or adjusted under 35 U.S.C. 154(b) by 14 days.

(21) Appl. No.: 12/086,456

(22) PCT Filed: Nov. 30, 2006

(86) PCT No.: PCT/EP2006/069163

§ 371 (c)(1), (2), (4) Date: Sep. 17, 2008

(87) PCT Pub. No.: WO2007/068605

PCT Pub. Date: Jun. 21, 2007

(65) Prior Publication Data

US 2009/0096197 A1 Apr. 16, 2009

(30) Foreign Application Priority Data

Dec. 13, 2005 (FR) .................................. 05 12582

(51) Int. Cl.
*B60R 21/26* (2006.01)

(52) U.S. Cl. .................. 280/741; 280/737; 102/531

(58) Field of Classification Search ................ 102/531; 280/741, 737; 149/36, 43, 61

See application file for complete search history.

(56) References Cited

U.S. PATENT DOCUMENTS

| 5,668,345 | A | * | 9/1997 | Schroeder et al. ........... 102/289 |
| 5,725,243 | A | * | 3/1998 | Skanberg .................... 280/737 |
| 5,963,740 | A | * | 10/1999 | Srivastava et al. ........... 717/130 |
| 6,065,774 | A | * | 5/2000 | Cabrera ...................... 280/741 |
| 6,068,293 | A | * | 5/2000 | Shirk et al. ................. 280/737 |
| 6,214,138 | B1 | | 4/2001 | Canterberry et al. |
| 6,231,078 | B1 | * | 5/2001 | Kokeguchi .................. 280/736 |
| 6,338,500 | B1 | * | 1/2002 | Perotto ....................... 280/741 |
| 6,487,974 | B1 | | 12/2002 | Canterberry et al. |
| 6,874,814 | B2 | * | 4/2005 | Hosey et al. ................. 280/737 |
| 2002/0007755 | A1 | | 1/2002 | Perotto et al. |
| 2007/0085309 | A1 | * | 4/2007 | Kelley et al. ................ 280/736 |

FOREIGN PATENT DOCUMENTS

EP 1160138 A 12/2001

* cited by examiner

*Primary Examiner*—Ruth Ilan
(74) *Attorney, Agent, or Firm*—Harness, Dickey & Pierce, P.L.C.

(57) ABSTRACT

The present invention relates to a gas generator for a motor vehicle safety device. The generator includes at least a combustion chamber and a gas tank. The combustion chamber contains a pyrotechnic initiator and pyrotechnic charge for generating gas and including at least one oxidizing material. Combustion of the charge is triggered by the initiator. The gas tank is closed towards the combustion chamber by a capsule. The capsule is suitable for giving way during combustion of the charge in order to release the gas from the tank and exhaust it towards the outside. The combustion chamber contains a metal charge of at least one metal. The metal charge is distinct from the pyrotechnic charge.

19 Claims, 1 Drawing Sheet

HYBRID TYPE GAS GENERATOR CONTAINING A METAL CHARGE

CROSS-REFERENCE TO RELATED APPLICATIONS

This application is a 371 U.S. National Stage of International Application No. PCT/EP2006/069163, filed Nov. 30, 2006 and published in English as WO 2007/068605 A2 on Jun. 21, 2007. This application claims priority to French Patent Application No. FR 0512582, filed Dec. 13, 2005, which application is herein expressly incorporated by reference.

FIELD

The present invention relates to a hybrid type gas generator for a motor vehicle safety device.

DISCUSSION

In general, this kind of generator comprises: a combustion chamber containing a pyrotechnic initiator and a pyrotechnic charge for generating gas and including at least one oxidizing material, with combustion of the charge being triggered by said initiator; and a gas tank that is closed towards the combustion chamber by a capsule, the capsule being suitable for giving way during combustion of said charge in order to release the gas from the tank and exhaust it towards the outside.

Usually, a transfer and diffusion chamber is interposed between the combustion chamber and the gas tank.

The gas generated by combustion of the charge passes through the transfer chamber in order to reach the capsule that then constitutes a barrier between said chamber and the gas tank. The capsule is generally a thin metal membrane.

When the capsule gives way, the cold gas present in the tank invades the transfer chamber, mixing with the hot gas generated by the combustion of the pyrotechnic charge and exhausting to the outside via peripheral openings leading to an airbag for inflation.

The stream of hot gas generated by the combustion of the pyrotechnic charge can be sufficient to weaken the capsule mechanically so that it gives way. However that does not always happen. And naturally that has harmful repercussions on the time taken to inflate the airbag and the quality of its inflation.

That is in particular the reason why gas generators have been developed that include a mechanical part that is movable so as to come into contact with the capsule in order to puncture it, split it, or detach it at least in part from its seat, so as to put the gas tank into communication with the remainder of the generator.

Examples of such mechanical parts include a projectile, a puncturing plunger, and a piston.

However that kind of solution necessarily has significant repercussions on the cost price of the generator.

Furthermore, installing such a part in the generator increases its size and its weight.

An object of the present invention is to solve those problems by providing a generator in which the capsule gives way without it being necessary to rely on moving a mechanical part, i.e. essentially by making use of the stream of hot gas generated by the combustion of the pyrotechnic charge.

The invention thus relates to a hybrid type gas generator for a motor vehicle safety device, the generator comprising at least: a combustion chamber containing a pyrotechnic initiator and a pyrotechnic charge for generating gas and including at least one oxidizing material, with combustion of the charge being triggered by said initiator; and a gas tank that is closed towards the combustion chamber by a capsule, the capsule being suitable for giving way during combustion of said charge in order to release the gas from the tank and exhaust it towards the outside.

According to the invention, said combustion chamber also contains a charge of least one metal, said charge being distinct from the pyrotechnic charge.

The present Applicant has found, on used generators, that the remains of the open capsule have traces of impacts, very possibly constituting zones of weakens that led to their opening.

Under the effect of the combustion, the metal charge oxidizes performing an exothermic oxidation-reduction reaction and liquefies, at least in part, with the resulting molten metal being entrained in the stream of gas and striking said capsule, in such a manner that its mechanical strength is weakened sufficiently for it to give way.

According to other characteristics of the generator that are advantageous but not limiting: said charge has more than one metal and is present in the form of an alloy; said metal charge presents a large exchange area; said metal charge is in the form in particular of beads, powder, optionally-tangled wires, a grid, or a sintered piece; said metal is selected from the following list: Al, Zn, Si, Mg, Sn, Mn, and B; and the ratio by weight of metal charge to pyrotechnic charge lies in the range 2% to 30%.

Other characteristics and advantages of the invention appear on reading the following detailed description of certain embodiments.

DRAWINGS

This description given in non-limiting manner refers to the accompanying figures, in which.

DETAILED DESCRIPTION

Figure 1:
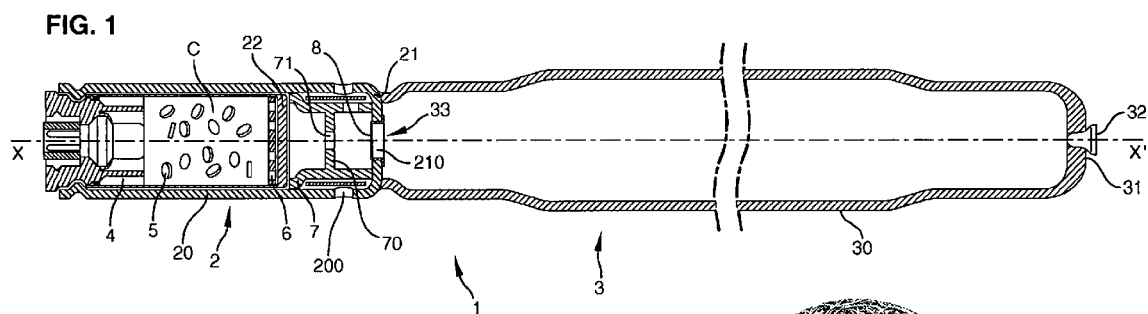
FIG. 1 is a simplified longitudinal section view of a hybrid generator to which the present invention can be applied.

FIG. 1 shows a generator suitable for implementing the characteristics of the present invention.

It is a hybrid generator of generally conventional structure.

The generator 1 is essentially constituted by an enclosure 2 having a gas tank 3 connected thereto.

The enclosure 2 is in the form of a hollow cylindrical metal body of longitudinal axis X-X'.

An initiator 4 is mounted in an upstream end opening present in the wall 20 of the enclosure 2, and centered on the axis X-X'. The initiator 4 is shown to the left in the figure and it is held in place by appropriate retention means.

The initiator communicates with a pyrotechnic charge 5 that occupies a combustion chamber C. In the example shown, the charge is constituted by propellant, for example. It is in the form of a set of pellets.

In a variant embodiment, the charge may be of some other form, e.g. constituted as a block, in particular an annular block, with an axis of revolution that coincides with the axis X-X'.

A grid 6 is adjacent to the pyrotechnic charge 5 and constitutes, so to speak, the downstream end of the combustion chamber C.

The assembly constituted by the initiator 4 and its support, the pyrotechnic charge 5, and the grid 6 is contained in a crimped "cartridge" 22 constituted by a thin metal film that provides the assembly with unity. Its structure is weak so as to give way as soon as its internal pressure increases.

This cartridge makes assembly easier and contributes to the operation of the generator.

The combustion chamber C is adjacent to a transfer and plenum chamber T which is constituted by a tubular assembly 7 of generally H-shaped longitudinal section, with a partition 70 extending transversely and pierced by an axial opening 71.

Between the assembly 7 and the longitudinal wall 20 of the enclosure 2 there is an annular peripheral space that constitutes a diffusion chamber D. A filter or screen 100 is placed therein to perform a function that is explained below.

The peripheral wall of the assembly 7 is provided with radial openings 72 serving to allow the gas that results from combustion of the charge 5 to escape towards the diffusion chamber D, which is itself provided with radial openings 200 (formed in the wall 20). The gas can then escape to the outside of the generator, into an inflatable airbag (not shown).

The filter or screen 100 present in the chamber D slows down the gas flow rate and retains any particles.

The opening 71 is situated facing another opening 210 formed in the transverse and downstream end wall 21 of the enclosure 2, for putting it into communication with the gas tank 3.

The tank is in the form of an elongate tube. At its end remote from the enclosure 2, the wall 30 of the tank presents extra thickness 31 with an axial opening that enables the tank to be filled, which opening is normally closed by a plug 32.

Figure 2:
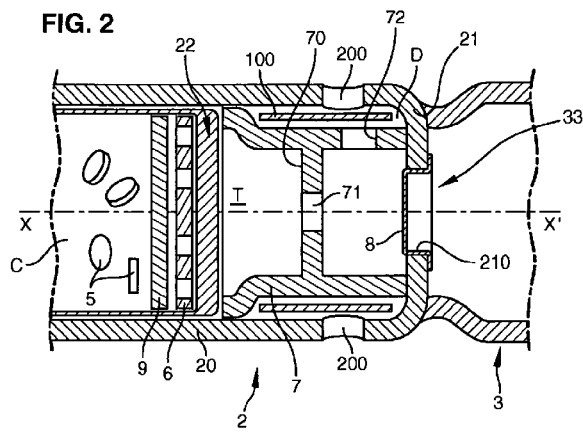
FIG. 2 is a fragmentary view, likewise in longitudinal section, showing a generator of the invention, and serving more particularly to show a preferred location for said metal charge.

In a period of non-operation, the opening 210 that puts the enclosure 2 into communication with the tank 3 is closed by a capsule 8, that can be seen particularly clearly in FIG. 2.

By way of example, this capsule is constituted by a thin sheet of a metal material.

The operation of such a generator is quite conventional.

Thus, as soon as the initiator 4 is started, it initiates combustion of the charge 5 and the resulting stream of gas and particles is filtered by the grid 6.

The "cartridge" 22 is designed to give way easily under the pressure of the gas so that the gas invades the chamber T and passes through the opening 71 that forms a nozzle. This nozzle acts, so to speak, to "concentrate" the gas stream towards the capsule 8.

The stream thus reaches the capsule 8 which gives way under its pressure and temperature. The remaining portion of the stream escapes from the generator through the opening 100, while the supply of gas present in the tank invades the chamber T, also to escape through the openings 100.

The hot gas then mixes with the cold gas from the tank prior to escaping to the outside through the openings 200 in the diffusion chamber D.

That is how the generator operates in theory, however as mentioned above, it is observed that opening said capsule 8 can present problems.

In accordance with the invention, the pyrotechnic charge 5 that is present in the combustion chamber includes at least one oxidizing material. In other words, its combustion releases oxygen or oxygenated matter. This applies to the majority of pyrotechnic charges on the market, and in particular charges based on propellant.

According to the invention, the combustion chamber C also contains a charge of at least one metal, this charge being distinct from the pyrotechnic charge 5.

The term "metal" is used throughout the present application to designate elements of the periodic table that are situated to the left of the diagonal starting with boron and going to polonium, the elements lying on this diagonal generally being referred to as "metalloids" and being included in the present definition.

Furthermore, the term "at least one metal" means that the charge may be constituted by two or more metals, to the exclusion of any other material (binder or other).

These metals are crystalline solids that can form metallic bonds and lose electrons in order to form cations.

However in the meaning of the invention, the term "metal charge" refers to metal that is in a non-cationic state. Thus, when the charge is constituted by aluminum, it is constituted by "Al" and not by "$Al^{3+}$".

In non-limiting manner, the metals that are particularly suitable in the context of the present invention are the following: aluminum, zinc, silicon, magnesium, tin, manganese, and boron.

As mentioned above, the metal charge is distinct from the pyrotechnic charge. This means that the metal charge is in a form in which it is not associated, bound, or combined with the pyrotechnic charge 5 or with other components present in the combustion chamber, e.g. by means of a binder.

Thus, for example, when the metal is constituted by a powder, the powder is present in the combustion chamber but is dissociated from the pyrotechnic charge 5.

Naturally, the metal charge 9 may be in a form other than that of a powder, and in particular it may be in a solid form, as shown in FIG. 2.

Under such circumstances, it preferably occupies the downstream end of the combustion chamber C, i.e. it is placed immediately in front of the above-mentioned grid 6 so as to lie on the "path" of the gas stream that results from the combustion.

In any event, it is preferable for the charge 9 to present a large exchange area.

Figure 3:
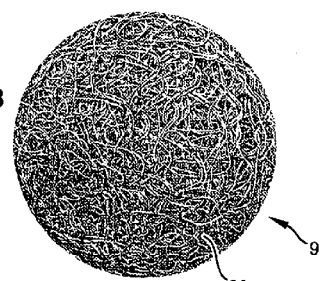
FIG. 3 is a face view of a first embodiment of said charge.

This applies to the embodiment shown in FIG. 3 where the charge 9 is constituted by a "wad" made of a tangle of metal wires, e.g. aluminum wires.

Figure 4:
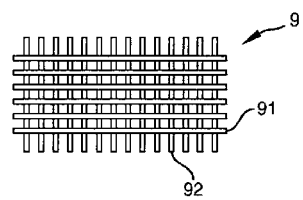
FIG. 4 is a fragmentary face view of a second embodiment of said charge.

In the embodiment of FIG. 4, the charge 9 is in the form of a grid constituted by an array of wires 91 and 92 disposed perpendicularly.

In other embodiments, the charge could also be in the form of beads or in the form of a sintered piece. However, in these circumstances, this charge is always distinct from the pyrotechnic charge.

The present Applicant has tested generators containing such a metal charge.

It has been found that the capsule 8 separating the enclosure 2 from the tank 3 opens in entirely correct manner and within a length of time that is entirely compatible with the times usually observed.

As mentioned above, the Applicant has also been able to observe that the fragments of the capsule present traces of mechanical attack.

As a result of the combustion of the pyrotechnic charge 5, the metal charge 9 oxidizes, performing an exothermic oxidation-reduction reaction, and liquefies at least in part, the resulting molten metal being entrained in the gas stream and striking the capsule 8 so that its mechanical strength is sufficiently weakened for it to give way.

The table below gives a list of metals that can be used in the context of the present invention, together with their respective boiling and melting points, and also the measured enthalpy values and the oxidation-reduction products that result from the reaction. These metals may naturally be used in the form of alloys.

| Metal | Boiling point (°C.) | Melting point (°C.) | Reaction enthalpy (Kcal/mol) | Reaction enthalpy (Kj/g) | Product of the oxidation-reduction Reaction |
|---|---|---|---|---|---|
| Al | 2467 | 660 | −399 | −16.4 | $Al_2O_3$ |
| Si | 2355 | 1410 | −202 | −14 | $SiO_2$ |
| Mg | 1090 | 649 | −143 | −14.8 | MgO |

Finally, the ratio by weight of metal charge to pyrotechnic charge preferably lies in the range 2% to 30%.

The invention claimed is:

1. A gas generator for a motor vehicle safety device, the generator comprising:
   a combustion chamber containing a pyrotechnic initiator and a pyrotechnic charge for generating gas and including at least one oxidizing material, with combustion of the charge being triggered by the initiator, the combustion chamber containing a metal charge of at least one metal, the metal charge being distinct from and dissociated from the pyrotechnic charge; and
   a gas tank closed towards the combustion chamber by a capsule, the capsule being suitable for giving way in response to combustion of the pyrotechnic charge in order to release the gas from the tank.

2. The generator according to claim 1, wherein the metal charge includes more than one metal and the charge is in the form of an alloy.

3. The generator according to claim 1, wherein the metal charge presents a large exchange area.

4. The generator according to claim 3, wherein the metal charge is in a form selected from a group including beads, powder, optionally-tangled wires, a grid, a sintered piece and combinations thereof.

5. The generator according to claim 1, wherein the at least one metal is selected from a group including: Al, Zn, Si, Mg, Sn, Mn, B and combinations thereof.

6. The generator according to claim 1, wherein a ratio by weight of the metal charge to the pyrotechnic charge is between approximately 2% to approximately 30%.

7. The generator of claim 1, in combination with the motor vehicle safety device.

8. The generator of claim 1, wherein the metal charge is in the form of a grid constituted by an array of wires.

9. The generator of claim 1, wherein the metal charge includes a plurality of metal wires.

10. The generator of claim 1, wherein the combustion chamber is bounded by a metallic cartridge.

11. The generator of claim 1, wherein the metal charge is disposed between the pyrotechnic charge and the capsule.

12. A gas generator for a motor vehicle safety device, the generator comprising:
    a combustion chamber;
    a pyrotechnic charge disposed in the combustion chamber for generating gas and including at least one oxidizing material;
    an initiator proximate the pyrotechnic charge for triggering combustion of the pyrotechnic charge;
    a metal charge of at least one metal disposed in the combustion chamber, the metal charge being distinct from and dissociated from the pyrotechnic charge; and
    a gas tank closed towards the combustion chamber by a capsule, the capsule being suitable for giving way in response to combustion of the pyrotechnic charge in order to release the gas from the tank.

13. The generator of claim 12, wherein the metal charge is in the form of a grid constituted by an array of wires.

14. The generator of claim 12, wherein the metal charge includes a plurality of metal wires.

15. The generator of claim 12, wherein the combustion chamber is bounded by a metallic cartridge.

16. The generator of claim 12, wherein the metal charge is disposed between the pyrotechnic charge and the capsule.

17. A gas generator for a motor vehicle safety device, the generator comprising:
    a combustion chamber;
    a pyrotechnic charge disposed in a first area of the combustion chamber for generating gas and including at least one oxidizing material;
    an initiator proximate the pyrotechnic charge for triggering combustion of the pyrotechnic charge;
    a metal charge of at least one metal disposed in a second area of the combustion chamber, the first area of the combustion chamber being distinct from and dissociated from the second area; and
    a gas tank closed towards the combustion chamber by a capsule, the capsule being suitable for giving way in response to combustion of the pyrotechnic charge in order to release the gas from the tank.

18. The gas generator of claim 17, wherein the metal charge is in a solid form.

19. The gas generator of claim 17, wherein the metal charge is in a downstream end of the combustion chamber.

* * * * *